United States Patent
Sekiguchi et al.

(10) Patent No.: US 11,801,703 B2
(45) Date of Patent: Oct. 31, 2023

(54) HEAT SENSITIVE TRANSFER RECORDING SHEET

(71) Applicant: CANON KABUSHIKI KAISHA, Tokyo (JP)

(72) Inventors: Takeshi Sekiguchi, Kawasaki (JP); Akiko Kitao, Kawasaki (JP); Ai Hayakawa, Ashigarakami-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 16/909,828

(22) Filed: Jun. 23, 2020

(65) Prior Publication Data
US 2020/0407572 A1 Dec. 31, 2020

(30) Foreign Application Priority Data

Jun. 27, 2019 (JP) ................. 2019-119747

(51) Int. Cl.
| | |
|---|---|
| *B41M 5/392* | (2006.01) |
| *B41M 5/388* | (2006.01) |
| *B41M 5/385* | (2006.01) |
| *C09B 29/036* | (2006.01) |
| *C09B 23/01* | (2006.01) |
| *C09B 23/04* | (2006.01) |

(52) U.S. Cl.
CPC ............ *B41M 5/392* (2013.01); *B41M 5/388* (2013.01); *B41M 5/3854* (2013.01); *B41M 2205/06* (2013.01); *B41M 2205/30* (2013.01); *C09B 23/0091* (2013.01); *C09B 23/04* (2013.01); *C09B 29/0048* (2013.01)

(58) Field of Classification Search
CPC .... B41M 5/3854; B41M 5/388; B41M 5/392; B41M 2205/06; B41M 2205/30
See application file for complete search history.

(56) References Cited

U.S. PATENT DOCUMENTS

2015/0367665 A1* 12/2015 Nakano ................... C09B 1/325
428/32.75

FOREIGN PATENT DOCUMENTS

| | | |
|---|---|---|
| JP | H03-277587 A | 12/1991 |
| JP | 2018-53157 A | 4/2018 |
| WO | 92/19684 A1 | 11/1992 |

OTHER PUBLICATIONS

Machine translation of detailed description of JP H 03-277587 acquired on Sep. 21, 2022.*
The Osaka Kyoiku University Bulletin, Division III, vol. 62, No. 2, pp. 13-22.

* cited by examiner

*Primary Examiner* — Gerard Higgins
(74) *Attorney, Agent, or Firm* — Canon U.S.A., Inc., IP Division

(57) ABSTRACT

A heat sensitive transfer sheet that achieves high optical density and high light resistance without generating scumming. The heat sensitive sheet has a base material and a coloring material layer formed on the base material, and the coloring material layer includes a compound represented by the following formula (1) and a particular dye compound:

Formula (1)

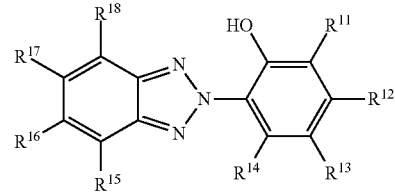

wherein
$R^{11}$ and $R^{13}$ each independently represent a hydrogen atom, an alkyl group, an aralkyl group, an unsubstituted aryl group or an aryl group having a substituent; and
$R^{12}$ and $R^{14}$ to $R^{18}$ each independently represent a hydrogen atom or an alkyl group.

4 Claims, No Drawings

HEAT SENSITIVE TRANSFER RECORDING SHEET

BACKGROUND OF THE INVENTION

Field of the Invention

The present disclosure relates to a heat sensitive transfer recording sheet.

Description of the Related Art

In recent years, there has been a growing demand for easy color printing of photos taken or processed using color display devices such as smart phones and tablet computers.

In particular, thermal transfer recording printers can print through a dry process and are compact and excel in portability, and thus has an advantage that they can print with ease in any environment.

Naturally, the image quality and storage stability of the recorded material are also important for thermal transfer recording printers, and therefore, heat sensitive transfer recording sheets having higher performance are being required.

Up to now, Japanese Patent Application Laid-Open No. H03-277587 discloses a number of examples in which an ultraviolet light absorber is contained in the dye of a heat sensitive transfer recording sheet mainly for the purpose of improving light resistance.

In addition, according to the Osaka Kyoiku University Bulletin, Division III, Volume 62, No. 2, pp. 13-22, autoxidation inhibitors such as hindered amines and UV cutting agents inhibit the fading of pigments. However, the photo-fading phenomenon of pigments is a very complex system that is affected by many factors such as not only the chemical structure of the pigment, but also the influence of the substrate, the attachment state of the pigment, external environmental factors, and the properties of the coexisting materials.

A phenomenon called catalytic fading is also known, in which a dye on the recording medium is selectively degraded by the catalytic action of another substance that coexists, and for example, a dye (for example, magenta) in the mixed color part is oxidized and faded by a reactive oxygen species such as singlet oxygen sensitized by another dye (cyan) that coexists.

Therefore, it is generally believed that mixing a dye and an ultraviolet light absorber improves light resistance, but in fact, depending on the combination thereof, there are some that decrease light resistance, some that do not improve light resistance so much, and some that dramatically improve light resistance.

On the other hand, although not in a heat sensitive transfer sheet, Japanese Patent Application Laid-Open No. 2018-53157 discloses a combination of a dye and an ultraviolet light absorber that dramatically improves light resistance in a toner.

In heat sensitive transfer sheets using a yellow dye having a particular structure or a magenta dye having a particular structure, there has been a disadvantage that those sheets do not satisfy high optical density and high light resistance at the same time without generating scumming on the transferred printed object.

SUMMARY OF THE INVENTION

The present disclosure has an object to provide a heat sensitive transfer recording sheet having high optical density and high light resistance without generating scumming on the transferred printed object by using an ultraviolet light absorber having a particular structure with a yellow dye having a particular structure or a magenta dye having a particular structure.

The present disclosure relates to a heat sensitive transfer recording sheet, having a base material and a coloring material layer formed on the base material, wherein the coloring material layer contains a compound represented by the following formula (1), and any one compound selected from the compound group consisting of a compound represented by the following formula (2), a compound represented by the following formula (3) and a compound represented by the following formula (4).

Formula (1)

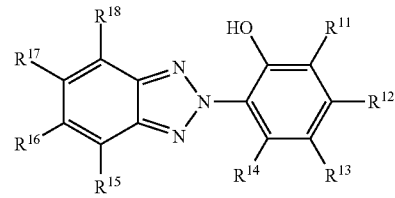

In the formula (1), $R^{11}$ and $R^{13}$ each independently represent a hydrogen atom, an alkyl group, an aralkyl group, an unsubstituted aryl group or an aryl group having a substituent; and $R^{12}$ and $R^{14}$ to $R^{18}$ each independently represent a hydrogen atom or an alkyl group.

Formula (2)

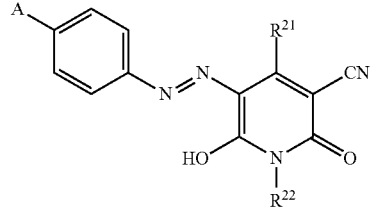

In the formula (2), $R^{21}$ and $R^{22}$ each represent an alkyl group; A represents $-SO_2N(R^{23})R^{24}$, $-CON(R^{23})R^{24}$ or $-COOR^{23}$; and $R^{23}$ and $R^{24}$ each independently represent a hydrogen atom or an alkyl group.

Formula (3)

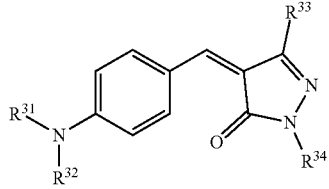

In the formula (3), $R^{31}$ and $R^{32}$ each independently represent an alkyl group; $R^{33}$ represents an alkyl group, an aryl group or an alkoxy group; and $R^{34}$ represents an alkyl group or an aryl group.

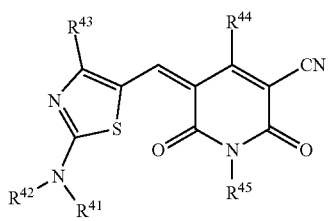

Formula (4)

In the formula (4), $R^{41}$ and $R^{42}$ each represent an alkyl group; $R^{43}$ represents a hydrogen atom, an alkyl group, an unsubstituted aryl group or an aryl group having a substituent; $R^{44}$ represents an alkyl group, an unsubstituted aryl group or an aryl group having a substituent; $R^{45}$ represents a hydrogen atom, an alkyl group, an unsubstituted aryl group, an aryl group having a substituent or —N(—$R^{46}$)$R^{47}$; and $R^{46}$ and $R^{47}$ satisfy the following provision (i) or (ii):

(i) $R^{46}$ and $R^{47}$ each independently represent a hydrogen atom, an alkyl group or an acyl group;

(ii) $R^{46}$ and $R^{47}$ are bonded to each other to form a ring, wherein $R^{46}$ and $R^{47}$ each represent an atomic group necessary for forming the ring.

Further features of the present disclosure will become apparent from the following description of exemplary embodiments.

DESCRIPTION OF THE EMBODIMENTS

Preferred embodiments of the present disclosure will now be described in detail.

Hereinafter, embodiments of the present disclosure will be described in detail, but the present invention is not limited to these embodiments.

The present inventors have conducted diligent researches in order to solve the above problem. As a result, the present inventors have found that, by having the coloring material layer formed on the base material contain a compound represented by the following formula (1) and any of compounds represented by the following formula (2) to (4), a heat sensitive transfer recording sheet having high optical density and high light resistance can be obtained without generating scumming.

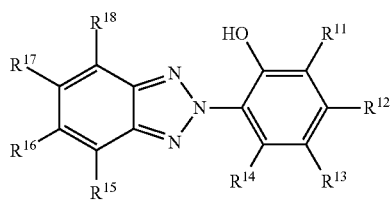

Formula (1)

In the formula (1), $R^{11}$ and $R^{13}$ each independently represent a hydrogen atom, an alkyl group, an aralkyl group, an unsubstituted aryl group or an aryl group having a substituent; and $R^{12}$ and $R^{14}$ to $R^{18}$ each independently represent a hydrogen atom or an alkyl group.

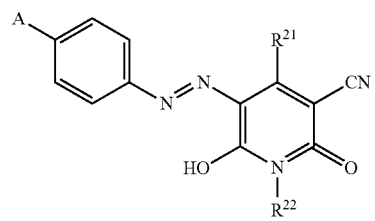

Formula (2)

In the formula (2), $R^{21}$ and $R^{22}$ each represent an alkyl group;

A represents —SO$_2$N($R^{23}$)$R^{24}$, —CON($R^{23}$)$R^{24}$ or —COOR$^{23}$; and $R^{23}$ and $R^{24}$ each independently represent a hydrogen atom or an alkyl group.

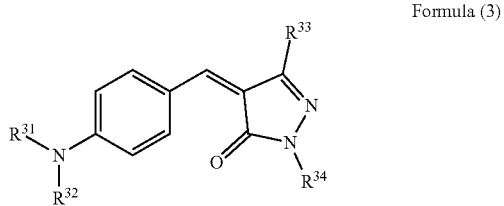

Formula (3)

In the formula (3), $R^{31}$ and $R^{32}$ each independently represent an alkyl group;

$R^{33}$ represents an alkyl group, an aryl group or an alkoxy group; and $R^{34}$ represents an alkyl group or an aryl group.

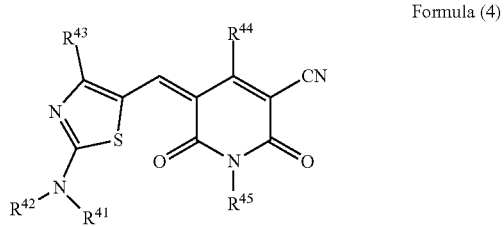

Formula (4)

In the formula (4), $R^{41}$ and $R^{42}$ each represent an alkyl group;

$R^{43}$ represents a hydrogen atom, an alkyl group, an unsubstituted aryl group or an aryl group having a substituent;

$R^{44}$ represents an alkyl group, an unsubstituted aryl group or an aryl group having a substituent;

$R^{45}$ represents a hydrogen atom, an alkyl group, an unsubstituted aryl group, an aryl group having a substituent or —N(—$R^{46}$)$R^{47}$; and $R^{46}$ and $R^{47}$ satisfy the following provision (i) or (ii):

(i) $R^{46}$ and $R^{47}$ each independently represent a hydrogen atom, an alkyl group or an acyl group;

(ii) $R^{46}$ and $R^{47}$ are bonded to each other to form a ring, wherein $R^{46}$ and $R^{47}$ each represent an atomic group necessary for forming the ring.

Note that, when the dye represented by any of the formulas (2) to (4) and the ultraviolet light absorber represented by the formula (1) are used in combination, a specifically remarkable effect can be obtained.

Generally, ultraviolet light absorbers are contained in the protective layer and are only used to cut out the ultraviolet light. In the present disclosure, however, it is presumed that, by having the ultraviolet light absorber contained in the coloring material layer, the ultraviolet light absorber not only simply cuts the ultraviolet light, but also interacts with the dye, thereby obtaining the effect described above. Also, while the above effect was not confirmed with a randomly selected dye and an ultraviolet light absorber, the above effect was confirmed when a dye and an ultraviolet light absorber each having a particular structure are used.

<Ultraviolet Light Absorber>

At first, the ultraviolet light absorber represented by the formula (1) will be described.

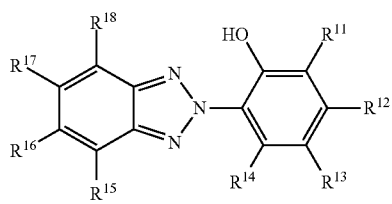

Formula (1)

In the formula (1),
$R^{11}$ and $R^{13}$ each independently represent a hydrogen atom, an alkyl group, an aralkyl group, an unsubstituted aryl group or an aryl group having a substituent; and
$R^{12}$ and $R^{14}$ to $R^{18}$ each independently represent a hydrogen atom or an alkyl group.

In the formula (1), examples of the alkyl group in $R^{11}$ and $R^{13}$ include, but are not particularly limited to, a linear, branched or cyclic, primary to tertiary alkyl group having 1 to 20 carbon atoms. Specific examples thereof include the following: a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group and a 2-ethylhexyl group.

In the formula (1), examples of the aralkyl group in $R^{11}$ and $R^{13}$ include, but are not particularly limited to, those having a linear, branched or cyclic, primary to tertiary alkylene group having 1 to 4 carbon atoms. Specific examples thereof include the following: a benzyl group, a phenethyl group and a 1-methyl-1-phenylethyl group.

In the formula (1), examples of the aryl group in $R^{11}$ and $R^{13}$ include, but are not particularly limited to, a phenyl group. Examples of the substituent in the aryl group having a substituent include a methyl group, an ethyl group and a methoxy group. Specific examples of the aryl group having a substituent include the following: a 2-methylphenyl group, a 3-methylphenyl group, a 4-methylphenyl group, a 2,6-dimethylphenyl group, a 2,6-diethylphenyl group, a 2,6-dimethoxyphenyl group, a 2,4,6-trimethylphenyl group, a 2,4,6-triethylphenyl group and a 3-methoxyphenyl group.

In the formula (1), examples of the alkyl group in $R^{12}$ and $R^{14}$ to $R^{18}$ include, but are not particularly limited to, a linear, branched or cyclic, primary to tertiary alkyl group having 1 to 20 carbon atoms. Specific examples thereof include the following: a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group and a 2-ethylhexyl group.

The ultraviolet light absorber compound having a structure represented by the formula (1) can be synthesized with reference to a conventionally known method. Alternatively, a commercially available material can be used therefor.

As preferable examples of the compound represented by the formula (1), compounds (1-1) to (1-8) are shown below, but the compound of the formula (1) is not limited to the following compounds.

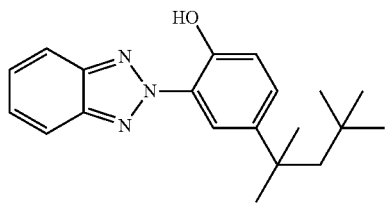

Compound (1-1)

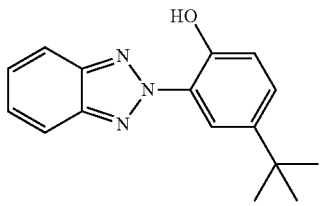

Compound (1-2)

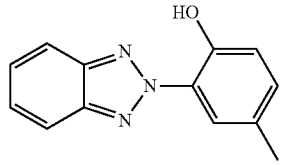

Compound (1-3)

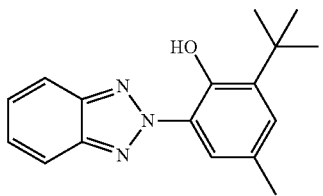

Compound (1-4)

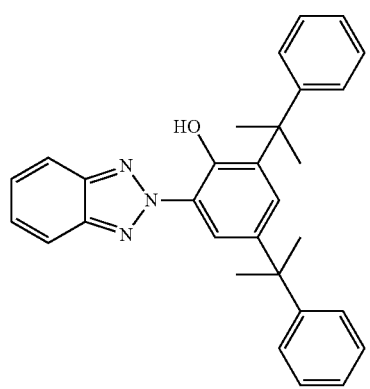

Compound (1-5)

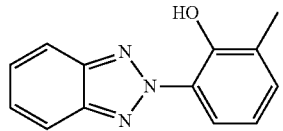

Compound (1-6)

-continued

Compound(1-7)

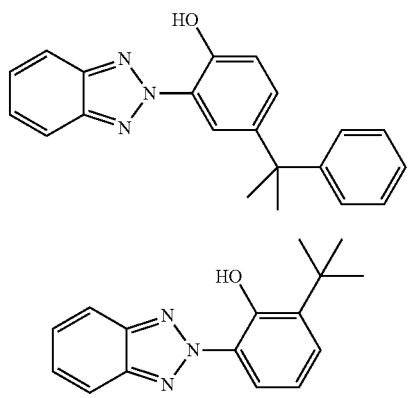

Compound(1-8)

The compound represented by the above formula (1) may be used singly, or may be used in combination of two or more kinds depending on the application.

In addition, it is preferable that the content of the compound having a structure represented by the formula (1) (ultraviolet light absorber) satisfy, with respect to the content of any of the compounds represented by the formulas (2) to (4) (dyes), the following relationship based on the mass:

Ultraviolet Light Absorber/Dye=1 to 2.

<Yellow Dye>

Next, the yellow dye represented by the formula (2) will be described.

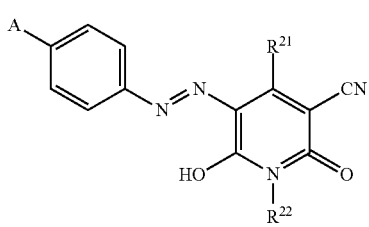

Formula (2)

In the formula (2),
$R^{21}$ and $R^{22}$ each represent an alkyl group;
A represents $-SO_2N(R^{23})R^{24}$, $-CON(R^{23})R^{24}$ or $-COOR^{23}$; and
$R^{23}$ and $R^{24}$ each independently represent a hydrogen atom or an alkyl group.

In the formula (2), examples of the alkyl group in $R^{21}$ and $R^{22}$ include, but are not particularly limited to, a linear, branched or cyclic, primary to tertiary alkyl group having 1 to 20 carbon atoms. Specific examples thereof include the following: a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group and a 2-ethylhexyl group. In particular, when a branched alkyl group such as a 2-ethylhexyl group is used, the dye has high color saturation, wide color gamut reproducibility, and improved light resistance, which is preferable.

In the formula (2), examples of the alkyl group in $R^{23}$ and $R^{24}$ include, but are not particularly limited to, a linear, branched or cyclic, primary to tertiary alkyl group having 1 to 20 carbon atoms. Specific examples thereof include the following: a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group and a 2-ethylhexyl group.

The yellow dye compound having a structure represented by the formula (2) can be synthesized with reference to a known method. Alternatively, a commercially available material can be used therefor. In addition, the compound of the formula (2) includes cis-trans structural isomers, and such cis-trans structural isomers are also included in the compound of the formula (2).

The compound of the formula (2) may be used singly, or may be used in combination of two or more kinds.

As preferable examples of the compound represented by the formula (2), compounds (2-1) to (2-45) are shown below, but the compound of the formula (2) is not limited to the following compounds.

Compound(2-1)

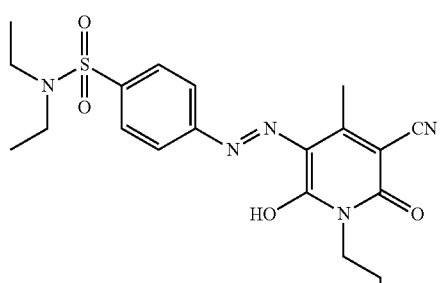

Compound(2-2)

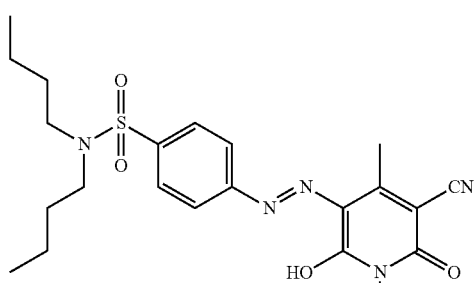

Compound(2-3)

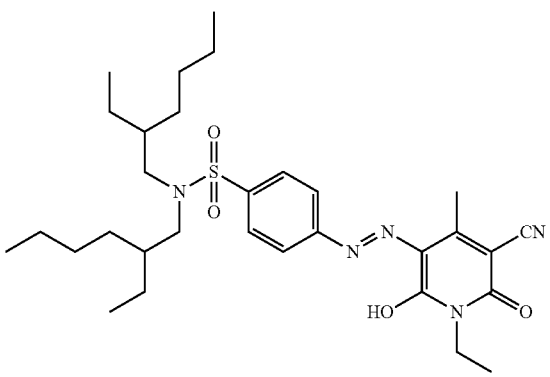

Compound(2-4)
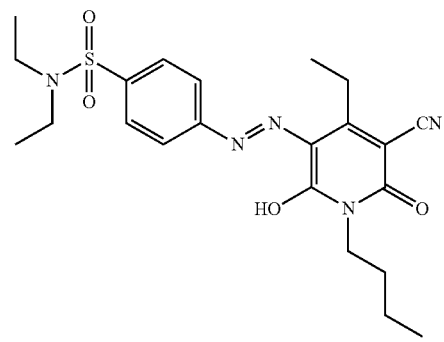
Compound(2-5)
Compound(2-6)
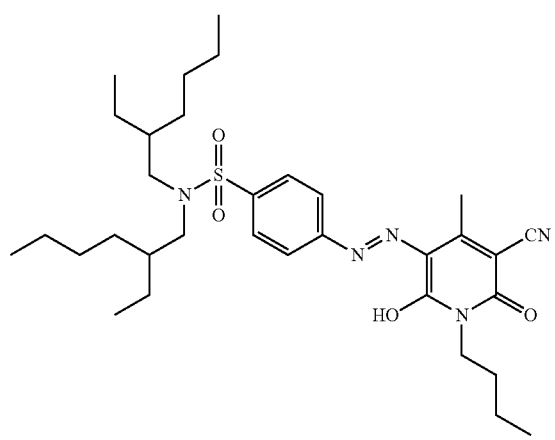
Compound(2-7)
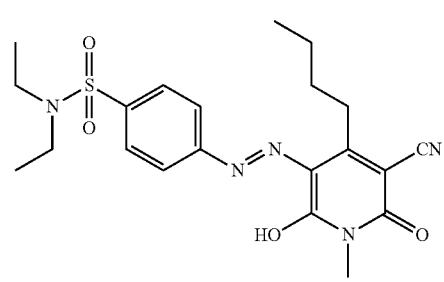
Compound(2-8)
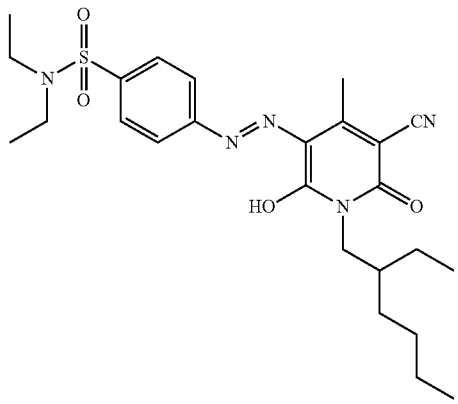
Compound(2-9)
Compound(2-10)
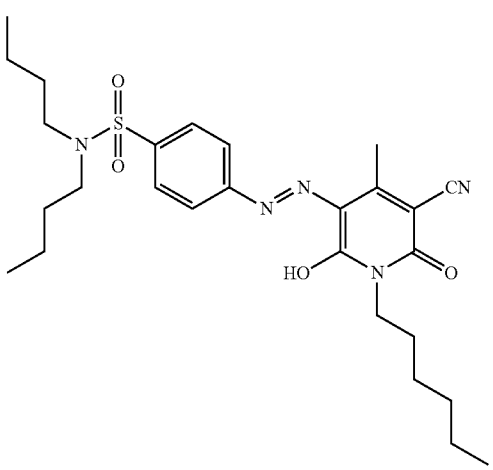
Compound(2-11)
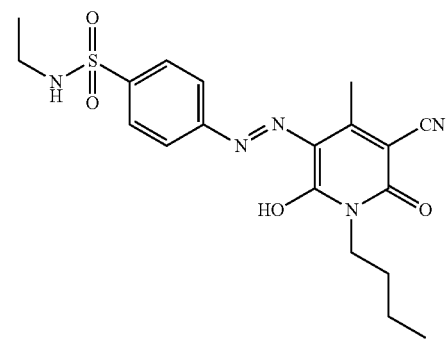

Compound(2-12)
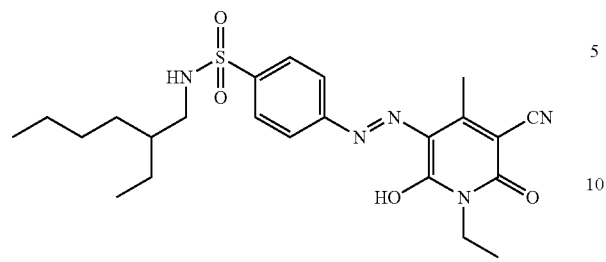
Compound(2-13)
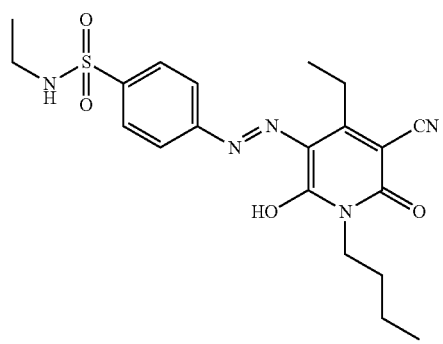
Compound(2-14)
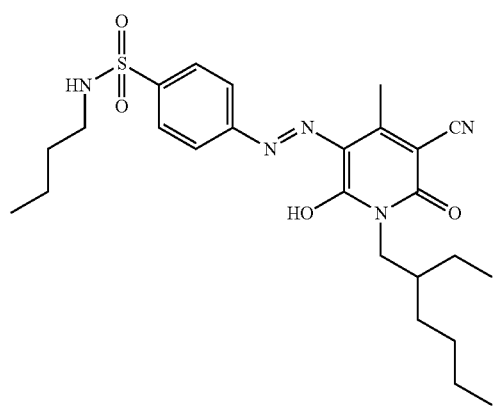
Compound(2-15)
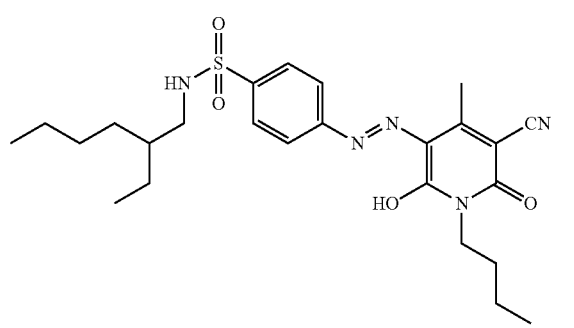
Compound(2-16)
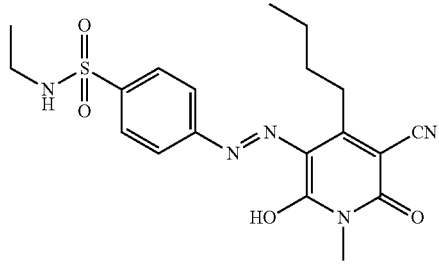
Compound(2-17)
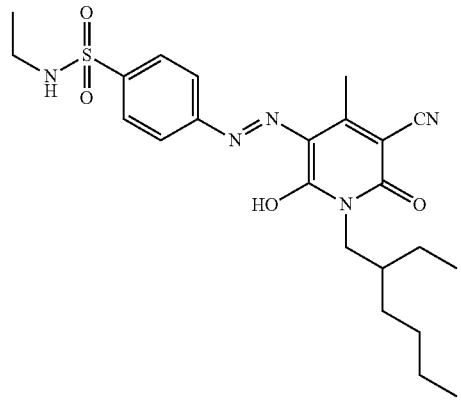
Compound(2-18)
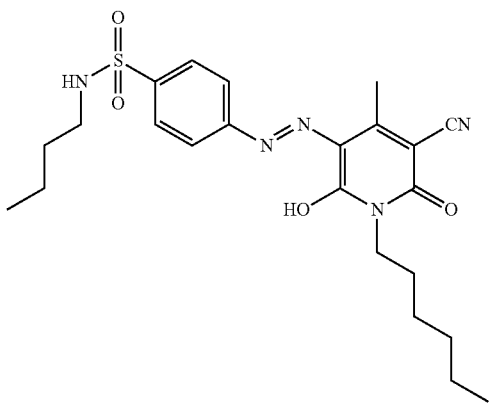
Compound(2-19)
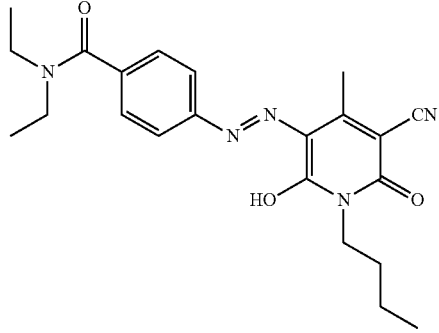

Compound(2-20)
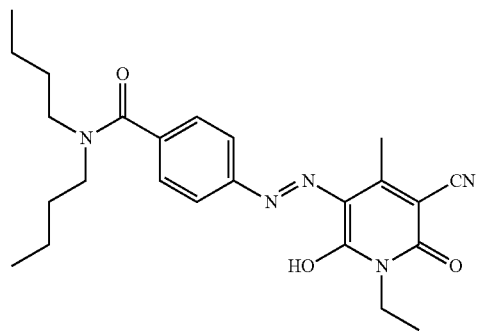
Compound(2-21)
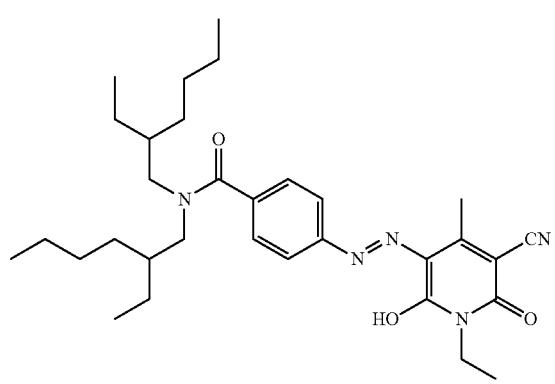
Compound(2-22)
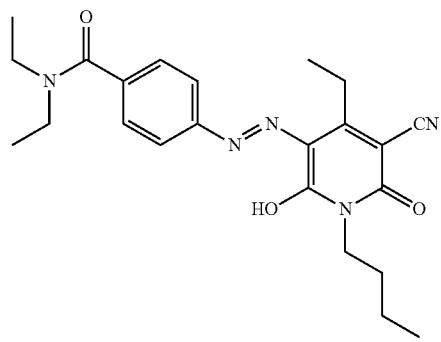
Compound(2-23)
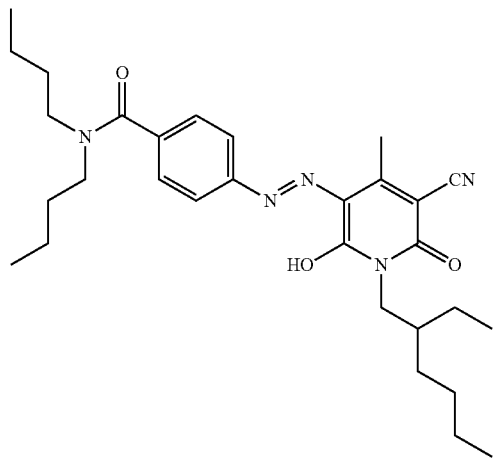
Compound(2-24)
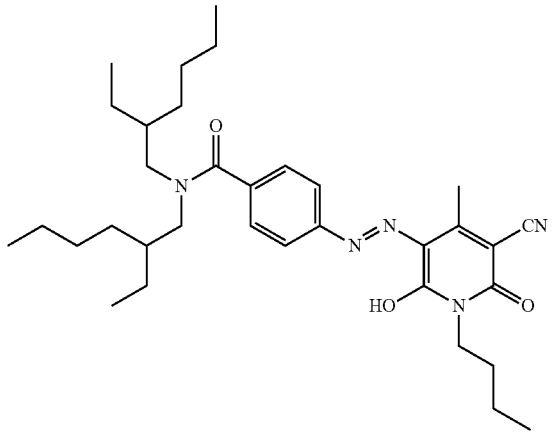
Compound(2-25)
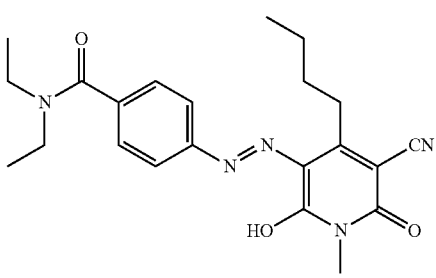
Compound(2-26)
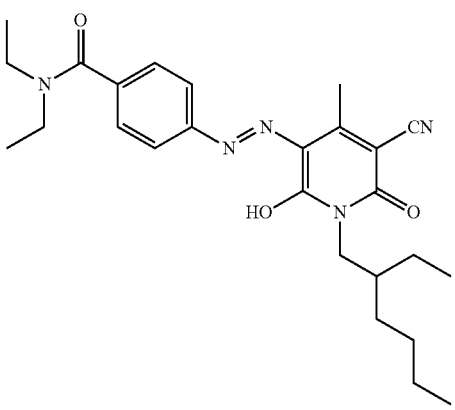
Compound(2-27)
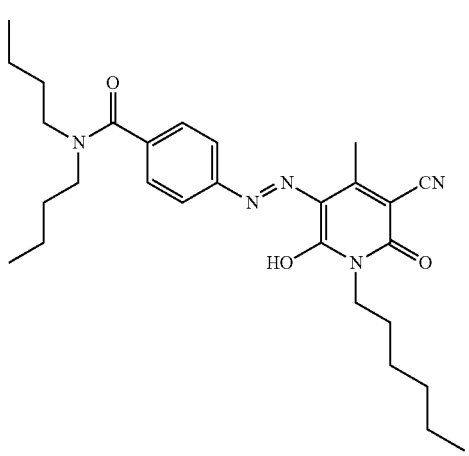

Compound(2-28)
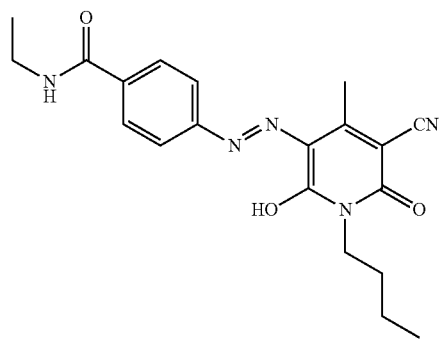
Compound(2-29)
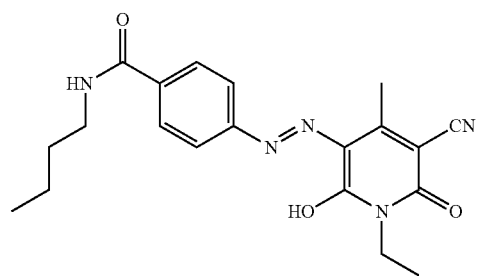
Compound(2-30)
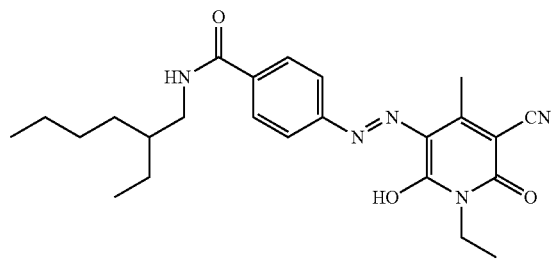
Compound(2-31)
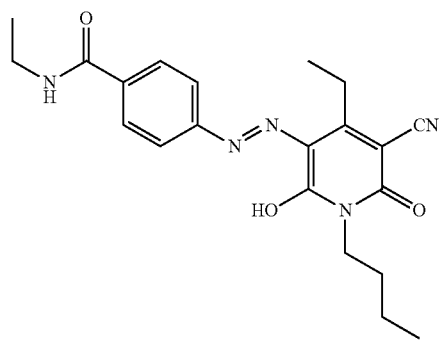
Compound(2-32)
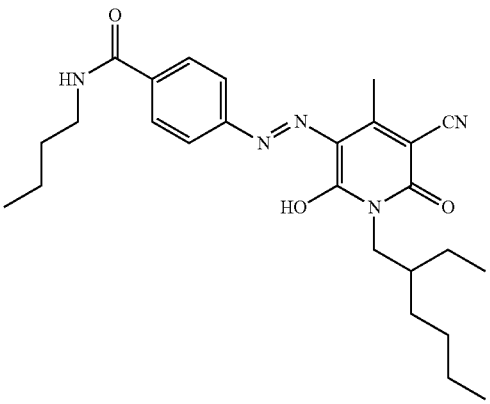
Compound(2-33)
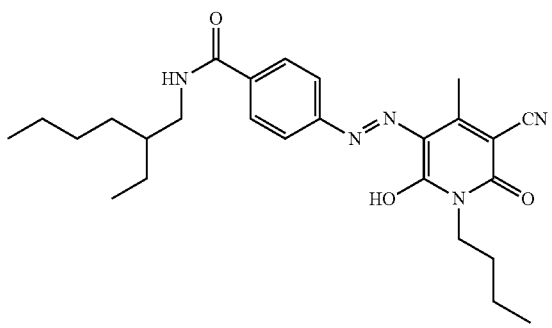
Compound(2-34)
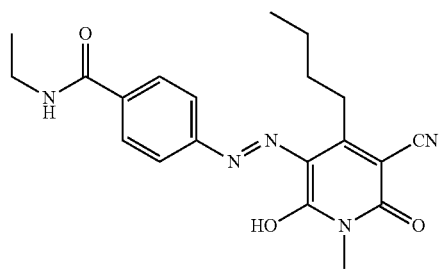
Compound(2-35)
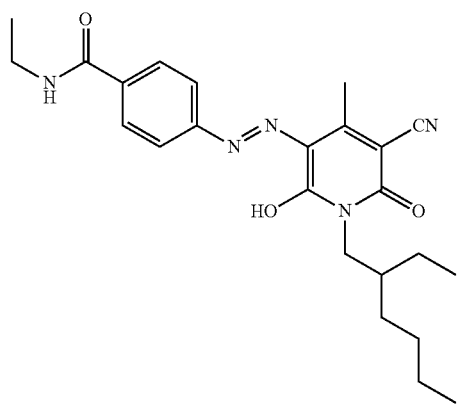

-continued
Compound(2-36)
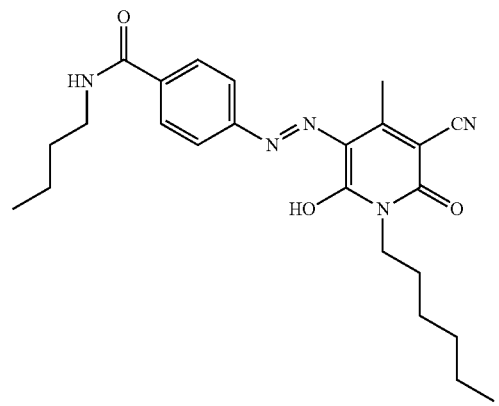
Compound(2-37)
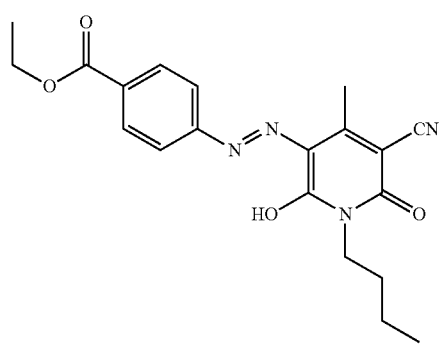
Compound(2-38)
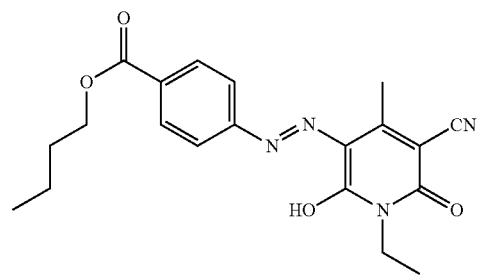
Compound(2-39)
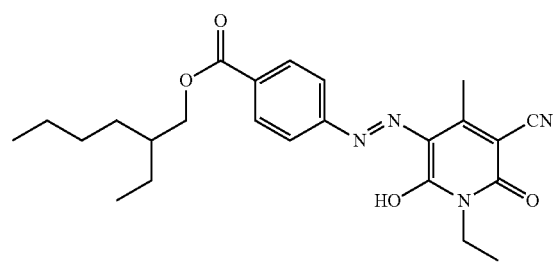
-continued
Compound(2-40)
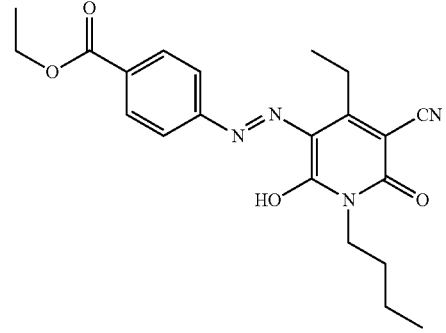
Compound(2-41)
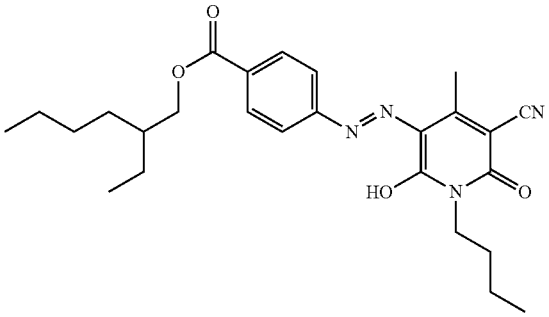
Compound(2-42)
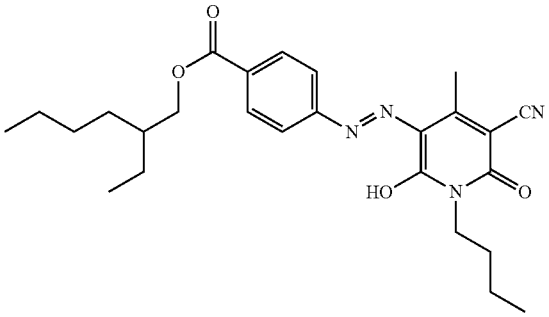
Compound(2-43)
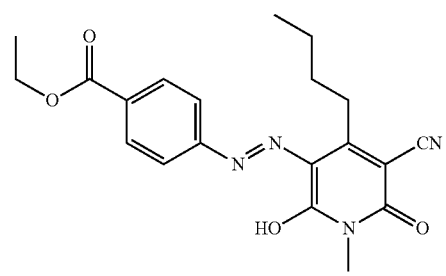

-continued

Compound(2-44)

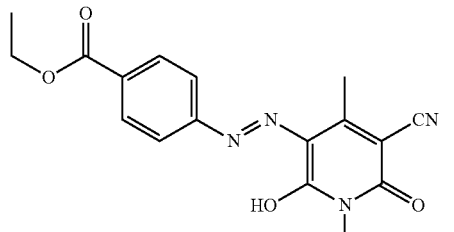

Compound(2-45)

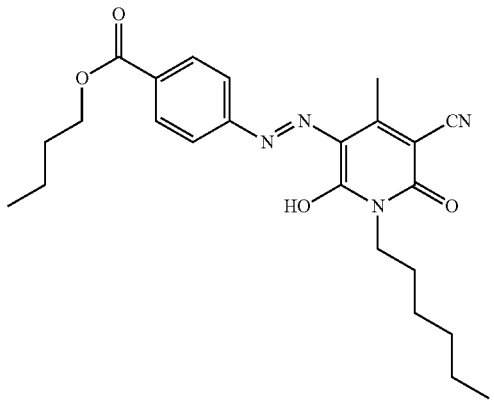

Next, the yellow dye represented by the formula (3) will be described.

Formula (3)

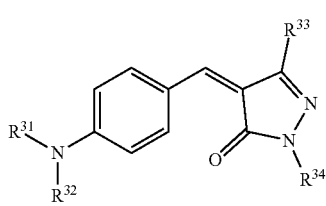

In the formula (3),
$R^{31}$ and $R^{32}$ each independently represent an alkyl group;
$R^{33}$ represents an alkyl group, an aryl group or an alkoxy group; and
$R^{34}$ represents an alkyl group or an aryl group.
In the formula (3), the alkyl group that $R^{31}$ to $R^{34}$ can represent is not particularly limited. Examples of this alkyl group include a methyl group, an ethyl group, a n-propyl group, an iso-propyl group and a n-butyl group, each of which is an alkyl group having 1 to 4 carbon atoms.

In the formula (3), the aryl group that $R^{33}$ and $R^{34}$ can represent is not particularly limited. Examples of this aryl group include a phenyl group and a tolyl group (a 2-methylphenyl group, a 3-methylphenyl group and a 4-methylphenyl group).

The alkoxy group that $R^{33}$ can represent is not particularly limited. Examples of this alkoxy group include a methoxy group, an ethoxy group and a propyl group. The compound of the formula (3) may be used singly, or may be used in combination of two or more kinds.

The yellow dye compound having a structure represented by the formula (3) can be synthesized with reference to a known method. Alternatively, a commercially available material can be used therefor.

As specific examples of the compound represented by the formula (3), compounds (3-1) to (3-5) are shown below, but the compound of the formula (3) is not limited to the following compounds.

Compound(3-1)

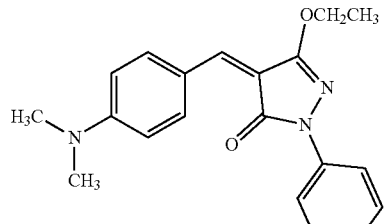

Compound(3-2)

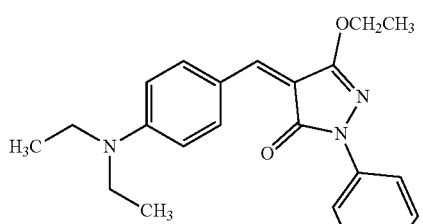

Compound(3-3)

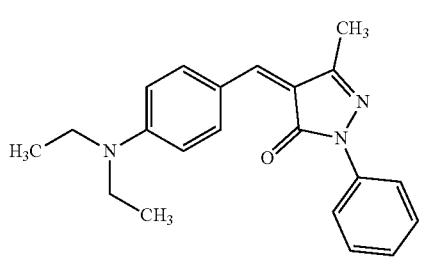

Compound(3-4)

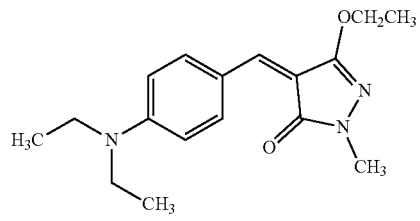

Compound(3-5)

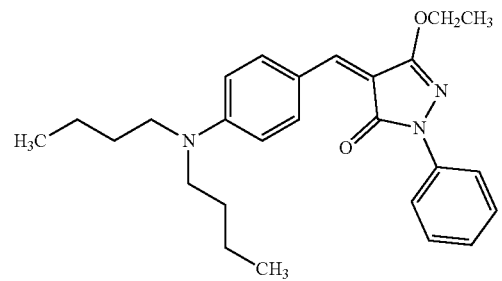

<Magenta Dye>

Next, the magenta dye represented by the formula (4) will be described.

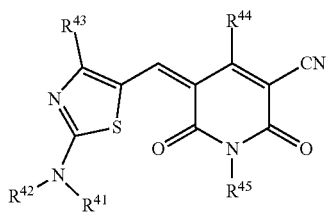

Formula (4)

In the formula (4), $R^{41}$ and $R^{42}$ each represent an alkyl group;

$R^{43}$ represents a hydrogen atom, an alkyl group, an unsubstituted aryl group or an aryl group having a substituent;

$R^{44}$ represents an alkyl group, an unsubstituted aryl group or an aryl group having a substituent;

$R^{45}$ represents a hydrogen atom, an alkyl group, an unsubstituted aryl group, an aryl group having a substituent or —N(—$R^{46}$)$R^{47}$; and $R^{46}$ and $R^{47}$ satisfy the following provision (i) or (ii):

(i) $R^{46}$ and $R^{47}$ each independently represent a hydrogen atom, an alkyl group or an acyl group;

(ii) $R^{46}$ and $R^{47}$ are bonded to each other to form a ring, wherein $R^{46}$ and $R^{47}$ each represent an atomic group necessary for forming the ring.

In the formula (4), examples of the alkyl group in $R^{41}$ and $R^{42}$ include, but are not particularly limited to, a linear, branched or cyclic, primary to tertiary alkyl group having 1 to 20 carbon atoms. Specific examples thereof include the following: a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group and a 2-ethylhexyl group.

In the formula (4), examples of the alkyl group in $R^{43}$ include, but are not particularly limited to, a linear, branched or cyclic, primary to tertiary alkyl group having 1 to 20 carbon atoms. Specific examples thereof include the following: a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group and a 2-ethylhexyl group.

In the formula (4), examples of the aryl group in $R^{43}$ include, but are not particularly limited to, a phenyl group. Examples of the substituent in the aryl group having a substituent include a methyl group, an ethyl group and a methoxy group. Specific examples of the aryl group having a substituent include the following: a 2-methylphenyl group, a 3-methylphenyl group, a 4-methylphenyl group, a 2,6-dimethylphenyl group, a 2,6-diethylphenyl group, a 2,6-dimethoxyphenyl group, a 2,4,6-trimethylphenyl group, a 2,4,6-triethylphenyl group and a 3-methoxyphenyl group.

In the formula (4), examples of the alkyl group in $R^{44}$ include, but are not particularly limited to, an alkyl group having 1 to 4 carbon atoms. Examples thereof include a methyl group, an ethyl group, a n-propyl group, an iso-propyl group, a n-butyl group, an iso-butyl group, a 2-methylbutyl group and a 2,3,3-trimethylbutyl group.

In the formula (4), examples of the aryl group in $R^{44}$ include, but are not particularly limited to, a phenyl group. Examples of the substituent in the aryl group having a substituent include a methyl group and a methoxy group. Specific examples of the aryl group having a substituent include a 2-methylphenyl group, a 3-methylphenyl group, a 4-methylphenyl group, a 4-methoxylphenyl group and 3,5-dimethylphenyl group.

In the formula (4), examples of the alkyl group in $R^{45}$ include, but are not particularly limited to, a methyl group, an ethyl group, a n-propyl group, an iso-propyl group, a n-butyl group and an iso-butyl group.

In the formula (4), examples of the aryl group in $R^{45}$ include, but are not particularly limited to, an unsubstituted phenyl group and a phenyl group having a substituent.

In the formula (4), when $R^{45}$ is —N(—$R^{46}$)$R^{47}$, examples of the alkyl group in $R^{46}$ and $R^{47}$ include, but are not particularly limited to, a linear, branched or cyclic, primary to tertiary alkyl group having 1 to 20 carbon atoms. Specific examples thereof include the following: a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group and a 2-ethylhexyl group.

In the formula (4), when $R^{45}$ is —N(—$R^{46}$)$R^{47}$, the acyl group in $R^{46}$ and $R^{47}$ is not particularly limited. Examples thereof include a substituted or unsubstituted alkylcarbonyl group having 2 to 30 carbon atoms and a substituted or unsubstituted arylcarbonyl group having 7 to 30 carbon atoms. Specific examples thereof include an acetyl group, a propionyl group, a pivaloyl group, a benzoyl group and a naphthoyl group. Alternatively, the acyl group may be —C(=O)-A (A represents a heterocycle). Specific examples thereof include a 2-pyridylcarbonyl group and a 2-furylcarbonyl group.

In the formula (4), when $R^{45}$ is —N(—$R^{46}$)$R^{47}$, examples of the ring that $R^{46}$ and $R^{47}$ are bonded to each other to form include, but are not particularly limited to, a piperidine ring, a piperazine ring and a morpholine ring.

In particular, at least either one of $R^{46}$ and $R^{47}$ is an alkyl group, the dye is excellent in light resistance, which is preferable.

The compound of the formula (4) may be used singly, or may be used in combination of two or more kinds.

The magenta dye compound having a structure represented by the formula (4) can be synthesized with reference to a known method described in International Publication No. WO 92/19684. Alternatively, a commercially available material can be used therefor. In addition, the compound of the formula (4) includes cis-trans structural isomers, and such cis-trans structural isomers are also included in the compound of the formula (4).

As preferable examples of the compound represented by the formula (4), compounds (4-1) to (4-48) are shown below, but the compound of the formula (4) is not limited to the following compounds.

Compound(4-1)
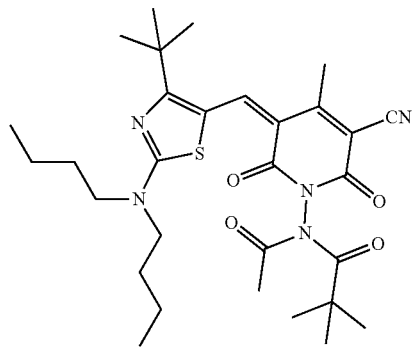
Compound(4-2)
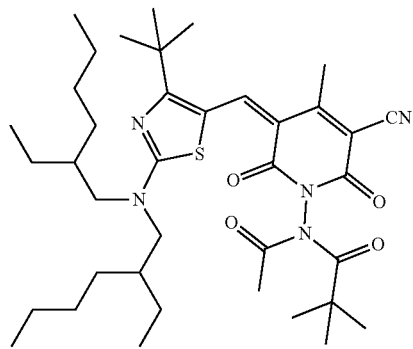
Compound(4-3)
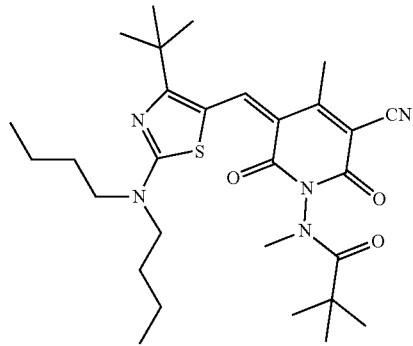
Compound(4-4)
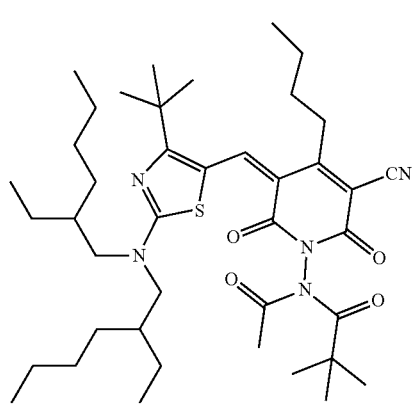
Compound(4-5)
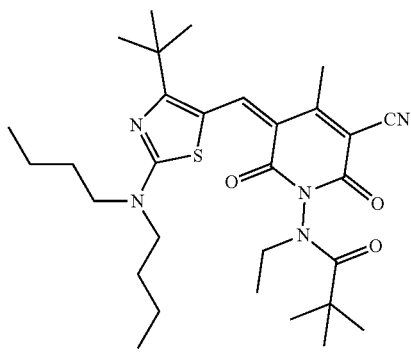
Compound(4-6)
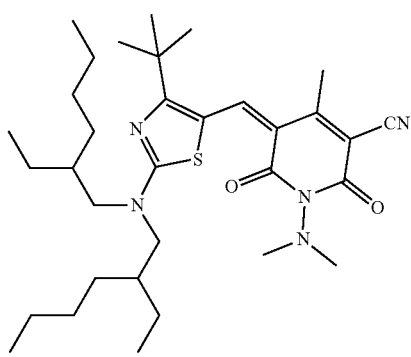
Compound(4-7)
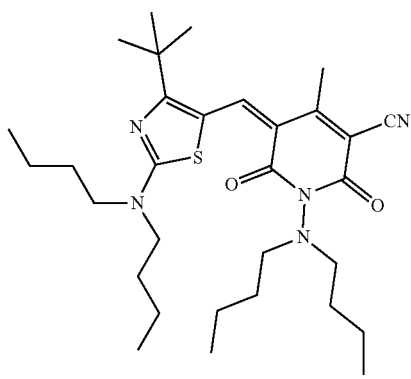
Compound(4-8)
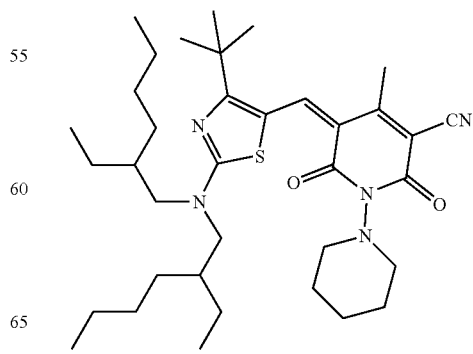

Compound(4-9)
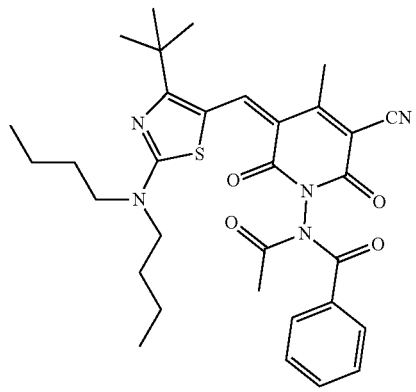
Compound(4-10)
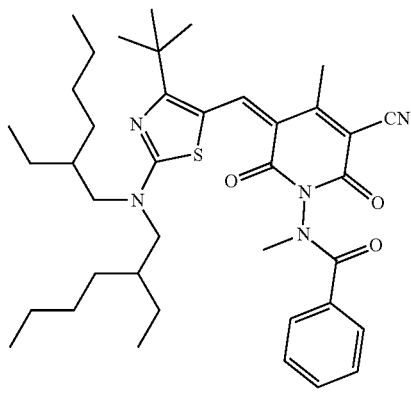
Compound(4-11)
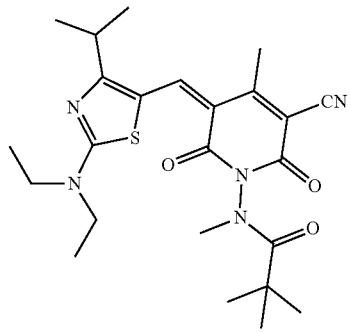
Compound(4-12)
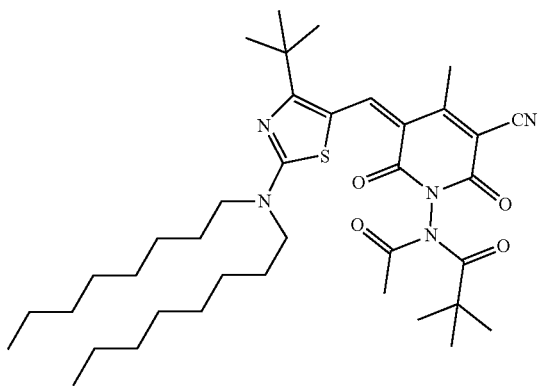
Compound(4-13)
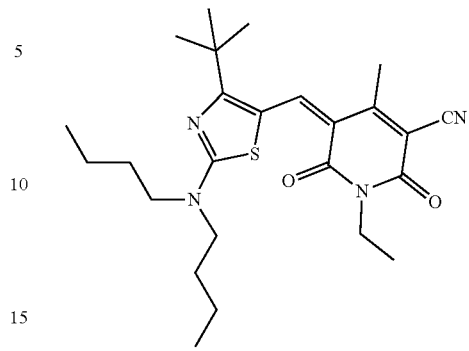
Compound(4-14)
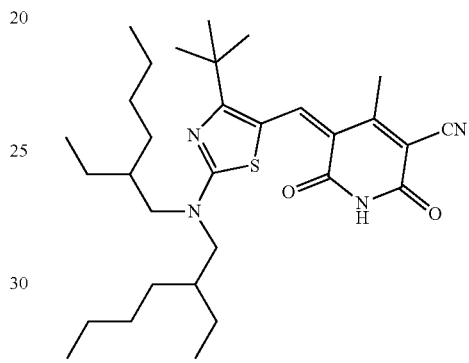
Compound(4-15)
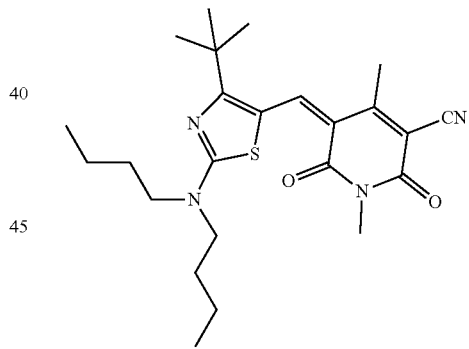
Compound(4-16)
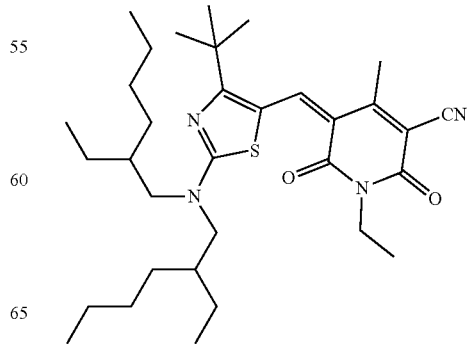

-continued
Compound(4-17)
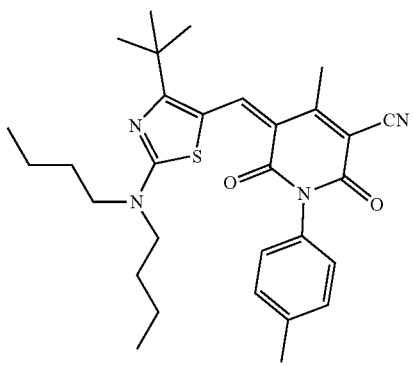
Compound(4-18)
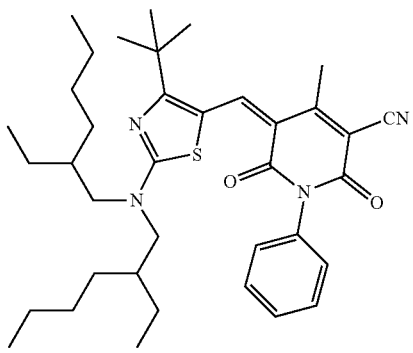
Compound(4-19)
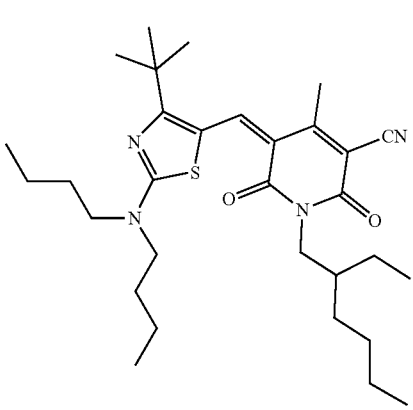
Compound(4-20)
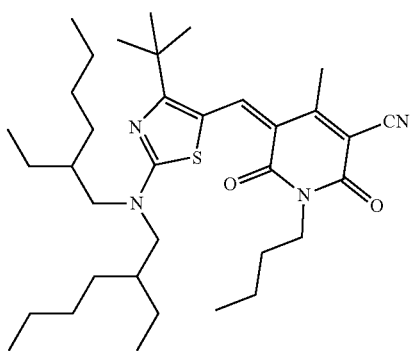
-continued
Compound(4-21)
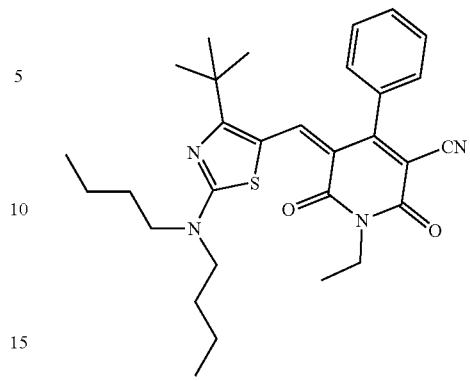
Compound(4-22)
Compound(4-23)
Compound(4-24)

Compound(4-25)
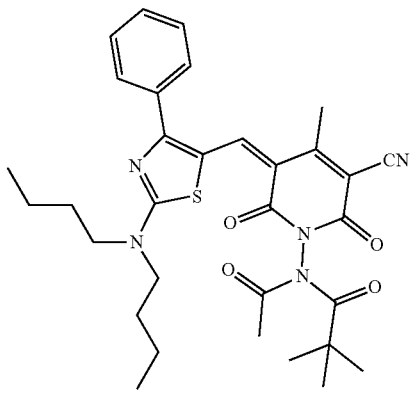
Compound(4-26)
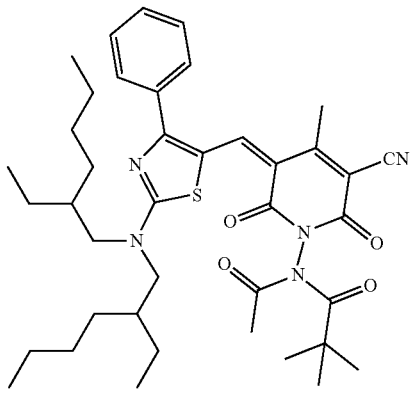
Compound(4-27)
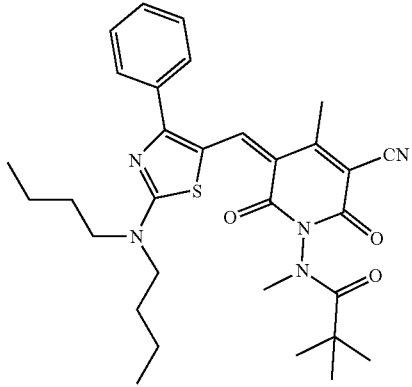
Compound(4-28)
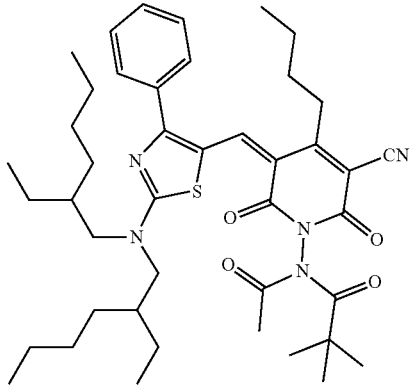
Compound(4-29)
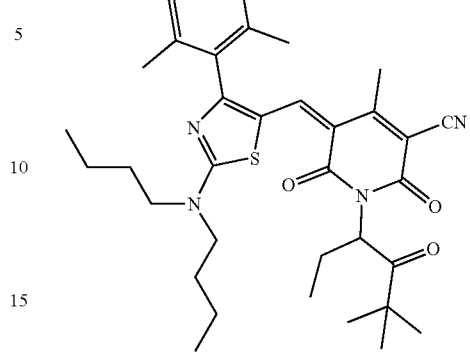
Compound(4-30)
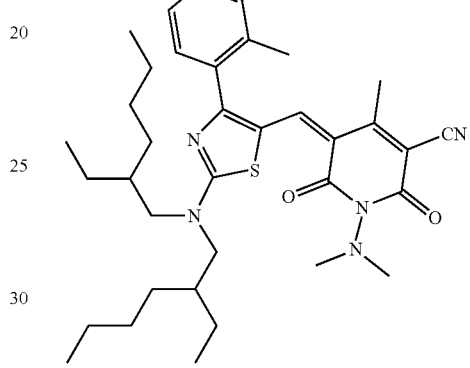
Compound(4-31)
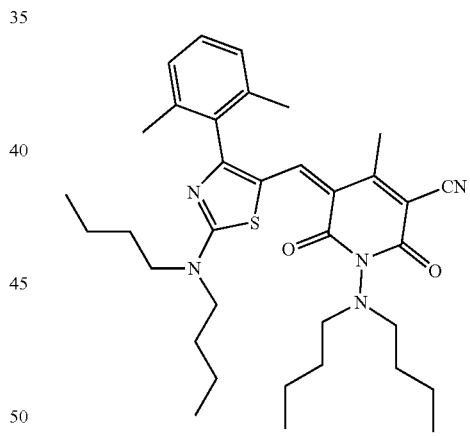
Compound(4-32)
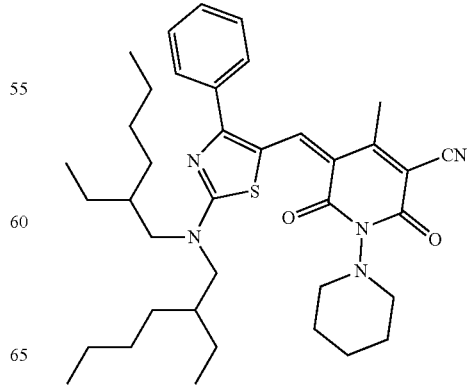

Compound(4-33)
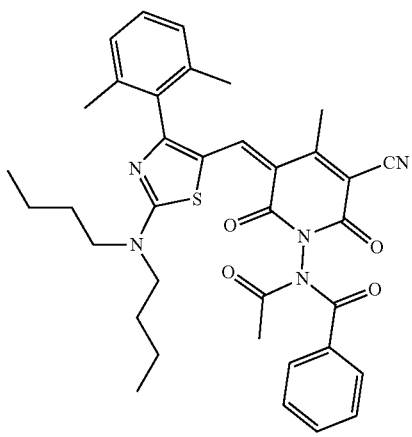
Compound(4-34)
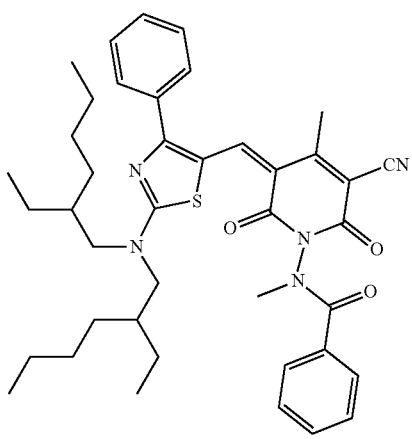
Compound(4-35)
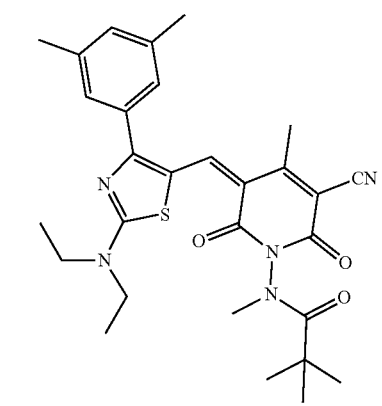
Compound(4-36)
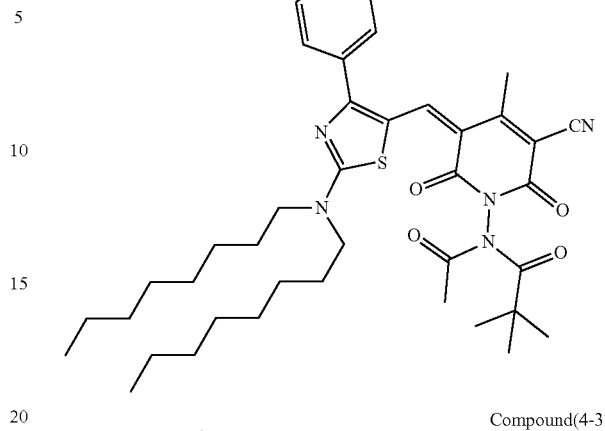
Compound(4-37)
Compound(4-38)
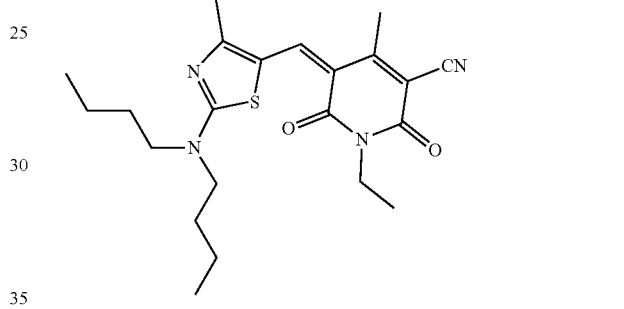
Compound(4-39)
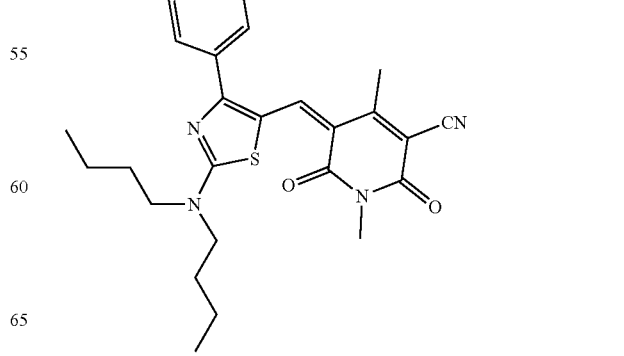

Compound(4-40)
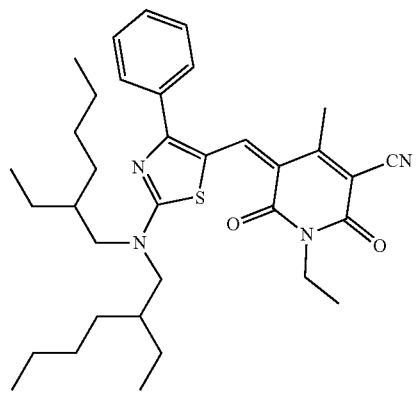
Compound(4-41)
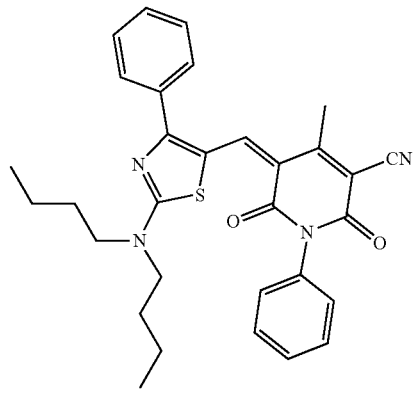
Compound(4-42)
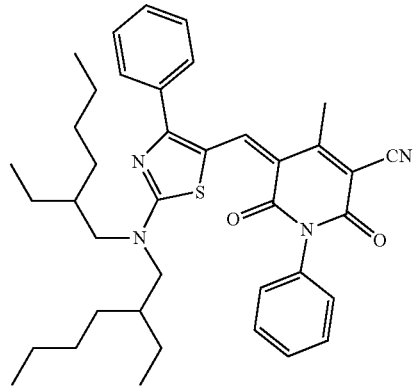
Compound(4-43)
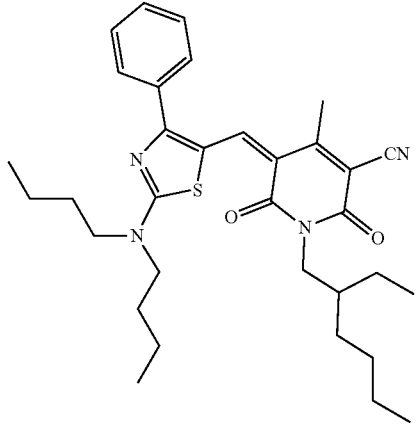
Compound(4-44)
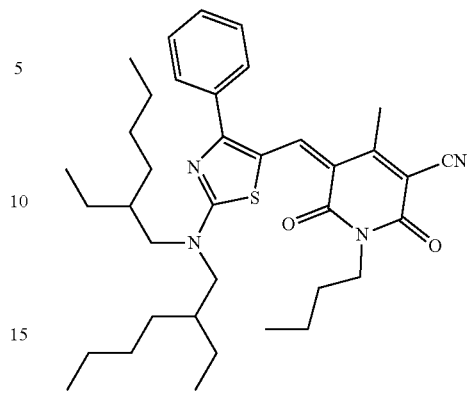
Compound(4-45)
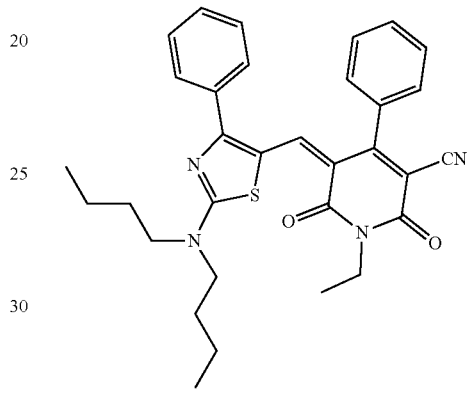
Compound(4-46)
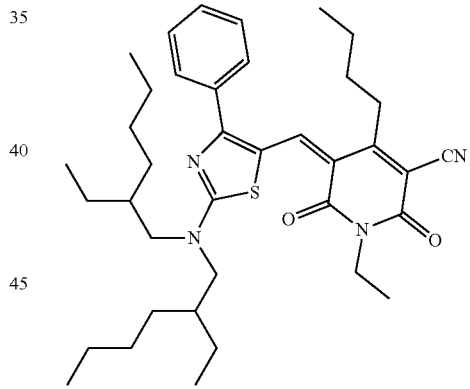
Compound(4-47)
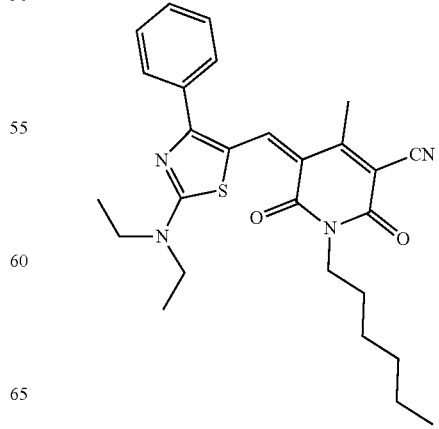

Compound(4-48)

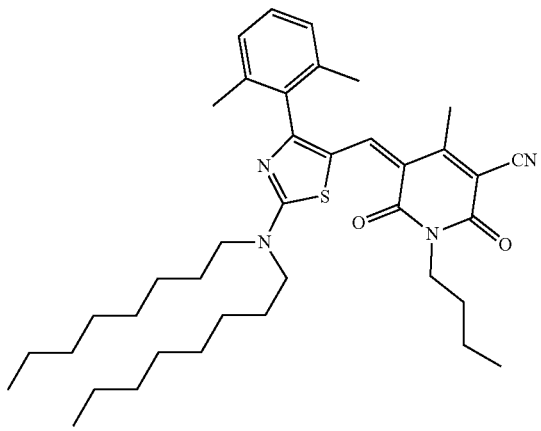

<Heat Sensitive Transfer Recording Sheet>

Next, the heat sensitive transfer recording sheet according to the present disclosure will be described.

The heat sensitive transfer recording sheet according to the present disclosure has a base material and a coloring material layer prepared by forming a film on the base material. In the coloring material layer, the yellow dye represented by the formula (2) or the formula (3), or the magenta dye represented by the formula (4), and also, the ultraviolet light absorber represented by the formula (1) are contained.

In the thermal transfer recording method, the heat sensitive transfer recording sheet is heated using a heating unit such as a thermal head in the state where the coloring material layer of the heat sensitive transfer recording sheet and the image receiving sheet having the coloring material receiving layer provided on the surface thereof are superimposed. By doing such, the coloring material in the coloring material layer of the heat sensitive transfer recording sheet is transferred to the coloring material receiving layer of the image receiving sheet, thereby performing image formation.

The above coloring material layer is basically formed by coating the base material sheet with the ink according to the present disclosure and drying the ink. Hereinafter, description will be given in further detail.

At first, a dye, an ultraviolet light absorber, a binder resin, and a surfactant and a wax, if required, are gradually added while stirring in the medium, and thoroughly blended into the medium. Subsequently, the above composition is stably dissolved or dispersed in a fine particle form by applying mechanical shear force using a dispersing machine, thereby preparing an ink. The ink is applied to a base film, which is the base material, and dried to form the coloring material layer. Furthermore, by forming a transferable protective layer, a heat resistant lubricating layer or the like, which will be described later, if required, the heat sensitive transfer recording sheet of the present disclosure can be obtained. Note that the heat sensitive transfer recording sheet of the present invention is not limited to the heat sensitive transfer recording sheet made according to the above production method.

[Dye]

The content of the compound represented by the formula (2) or the formula (3) (yellow dye), or the compound represented by the formula (4) (magenta dye) is preferably 1 part by mass or more and 150 parts by mass or less based on 100 parts by mass of the binder resin contained in the coloring material layer. In addition, from the viewpoint of dispersibility of the coloring material in the dispersion liquid, the above content is preferably 1 part by mass or more and 20 parts by mass or less. Note that, when two or more dyes are mixed for use, it is preferable that the total amount thereof be within the above range.

[Ultraviolet Light Absorber]

The content of the compound represented by the formula (1) (ultraviolet light absorber) is preferably 1 part by mass or more and 150 parts by mass or less based on 100 parts by mass of the binder resin contained in the coloring material layer. From the viewpoint of dispersibility of the ultraviolet light absorber in the dispersion liquid, the above content is preferably 1 part by mass or more and 40 parts by mass or less. Note that, when two or more ultraviolet light absorbers are mixed for use, it is preferable that the total amount thereof be within the above range.

[Binder Resin]

The binder resin is preferably, but is not particularly limited to, any of the following organic solvent soluble resins: water soluble resins such as a cellulose resin, a polyacrylic acid resin, a starch resin and an epoxy resin; a polyacrylate resin, a polymethacrylate resin, a polystyrene resin, a polycarbonate resin, a polyethersulfone resin, a polyvinyl butyral resin, an ethylcellulose resin, an acetylcellulose resin, a polyester resin, an AS resin, a phenoxy resin and the like. These resins may be used singly as one kind, or may be used in combination of two or more kinds as necessary.

[Surfactant]

To the heat sensitive transfer recording sheet of the present disclosure, in order to make the sheet sufficiently smooth upon heating it with a thermal head (upon printing), a surfactant may be added.

[Wax]

To the heat sensitive transfer recording sheet of the present disclosure, in order to make the sheet sufficiently smooth when it is not heated with a thermal head, a wax may be added. Examples of the wax that can be added include, but are not limited to, a polyethylene wax, a paraffin wax and a fatty acid ester wax.

To the heat sensitive transfer recording sheet of the present disclosure, in addition to the above additives, a preservative, an oxidation inhibitor, an antistatic agent, a viscosity modifying agent and the like may be added, as necessary.

[Medium]

Examples of the medium that is used for preparation of the dispersion upon forming the coloring material layer include, but are not particularly limited to, water or an organic solvent. Preferable examples of the organic solvent include the following: alcohols such as methanol, ethanol, isopropanol and isobutanol; cellosolves such as methyl cellosolve and ethyl cellosolve; aromatic hydrocarbons such as toluene, xylene and chlorobenzene; esters such as ethyl acetate and butyl acetate; ketones such as acetone, methyl ethyl ketone, methyl isobutyl ketone and cyclohexanone; halogenated hydrocarbons such as methylene chloride, chloroform and trichloroethylene; ethers such as tetrahydrofuran and dioxane; N,N-dimethylformamide and N-methylpyrrolidone. The above organic solvents may be used singly as one kind, or may be used in combination of two or more kinds as necessary.

[Base Material]

Next, the base material, which constitutes the heat sensitive transfer recording sheet, will be described. The base material supports the above coloring material layer, and as long as it is a film having a certain degree of heat resistance and strength, there is no particular limitation thereon, and those known can be used therefor. Examples thereof include the following: a polyethylene terephthalate film, a polyethylene naphthalate film, a polycarbonate film, a polyimide film, a polyamide film, an aramid film, a polystyrene film, a 1,4-polycyclohexylenedimethylene terephthalate film, a polysulfone film, a polypropylene film, a polyphenylene sulfide film, a polyvinyl alcohol film, cellophane, a cellulose derivative, a polyethylene film, a polyvinyl chloride film, a nylon film, a condenser paper and a paraffin paper. Among these, a polyethylene terephthalate film is preferable from the viewpoint of mechanical strength, solvent resistance and economic efficiency.

The thickness of the above base material is 0.5 µm or more and 50 µm or less, and is preferably 3 µm or more and 10 µm or less, from the viewpoint of transferability.

When a dye ink is applied onto the base material to form a coloring material layer, the wettability, adhesiveness or the like of the coating liquid tend to be deficient. For this reason, it is preferable to perform an adhesion treatment to the surface of the base material on which the above coloring material layer is to be formed (formation surface), as necessary. The coloring material layer may be formed on either one side or both sides of the base material. Examples of the adhesion treatment may include, but are not particularly limited to, an ozone treatment, a corona discharge treatment, an ultraviolet light treatment, a plasma treatment, a low temperature plasma treatment, a primer treatment and a chemical treatment. Also, some of these treatments may be carried out in combination.

As the above adhesion treatment for the base material, the base material may be coated with an adhesive layer. Examples of the adhesive layer include, but are not particularly limited to, the following: a fine particle of organic materials such as a polyester resin, a polystyrene resin, a polyacrylate ester resin, a polyamide resin, a polyether resin, a polyvinyl acetate resin, a polyethylene resin, a polypropylene resin, a polyvinyl chloride resin, a polyvinyl alcohol resin and a polyvinyl butyral resin; and a fine particle of inorganic materials such as silica, alumina, magnesium carbonate, magnesium oxide and titanium oxide.

EXAMPLES

Hereinafter, the present disclosure will be described in further detail with reference to Examples and Comparative Examples, but the present invention is not limited to these Examples. Note that, in the text, the term "parts" refers to the "parts by mass" unless otherwise noted.

Example 1

[Production of Ink]

To a mixed solution of 115 parts of methyl ethyl ketone and 115 parts of toluene, 10 parts of a polyvinyl butyral resin (Denka 3000-K; manufactured by DENKI KAGAKU KOGYO KABUSHIKI KAISHA) was added in small portions and dissolved therein. To this solution, 7 parts of the compound (2-3) and 7 parts of the compound (1-1) were added and dissolved therein, thereby producing an ink.

[Production of Heat Sensitive Transfer Recording Sheet and Image Sample]

This ink was applied onto a polyethylene terephthalate film having a thickness of 4.5 µm thick (Lumirror (registered trademark); manufactured by TORAY INDUSTRIES, INC.) such that the thickness after drying was 1 µm, and then dried to make a heat sensitive transfer recording sheet.

The heat sensitive transfer recording sheet thus formed was transferred onto a printing paper, using a modified Selphy machine (manufactured by Canon Inc.), thereby producing an image sample.

[Evaluation of OD]

For each of the produced image samples, the optical density (OD) was measured using a spectral densitometer (a fluorescence spectral densitometer FD-7, manufactured by Konica Minolta Japan, Inc.).

[Evaluation of Scumming]

For each of the produced image samples, a sample with a value obtained by subtracting the OD of the printing paper from the OD of the non-image part of greater than 0.1 was considered to be "NG", and a sample with a value of no more than 0.1 was considered to be "OK".

[Evaluation of Light Resistance]

The above image sample was placed in a xenon testing apparatus (ATLAS Weather-Ometer Ci4000, manufactured by Toyo Seiki Seisaku-sho, Ltd.), and exposed for 70 hours under the following conditions (illuminance: 0.28 W/m² at 340 nm, black panel temperature: 40° C., relative humidity: 50%). The O.D. residual ratio was defined as follows:

$$O.D. \text{ Residual Ratio} = (OD_5/OD_0)$$

where the initial optical density was set to $OD_0$ and the optical density after the exposure for 70 hours was set to $OD_5$.

Note that those having a O.D. residual ratio of greater than 1 was described as ≈1.00.

Examples 2 to 14

Inks were prepared in the same manner as in Example 1 except that the compound (2-3) used as the dye and the compound (1-1) used as the additive agent in Example 1 were changed to the compounds shown in Table 1, respectively, and the ratio of the additive agent/the dye was set to the values shown in Table 1. The amount of the dyes was always set to 7 parts, and the amount of the additive agents was varied. For example, in the case of Example 10, the amount of the compound (4-6) was 7 parts, and the amount of the compound (1-1) was 14 parts. In addition, heat sensitive transfer recording sheets were made using the inks prepared, and evaluations were carried out in the same way as in Example 1.

Comparative Examples 1 to 34

Inks were prepared in the same manner as in Example 1 except that the compound (2-3) used as the dye and the compound (1-1) used as the additive agent in Example 1, as well as their amounts, were changed to the compounds and the amounts shown in Table 1, respectively, and the ratio of the additive agent/the dye was set to the values shown in Table 1. Note that the amount of the dyes was always set to 7 parts, and the amount of the additive agents was varied. For example, in the case of Comparative Example 1, only 7 parts of the comparative compound C1 was used. In addition, heat sensitive transfer recording sheets were made using the inks prepared, and evaluations were carried out in the same way as in Example 1.

Comparative Compound C1
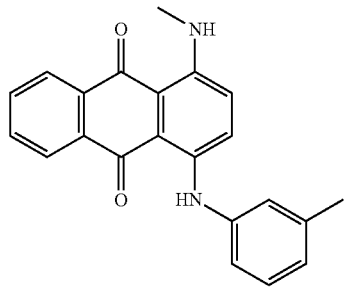
Comparative Compound A1
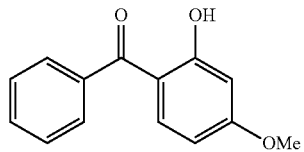
Comparative Compound Y1
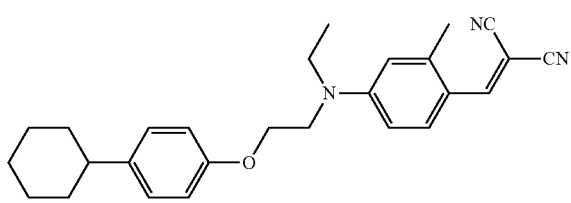
Comparative Compound Y2
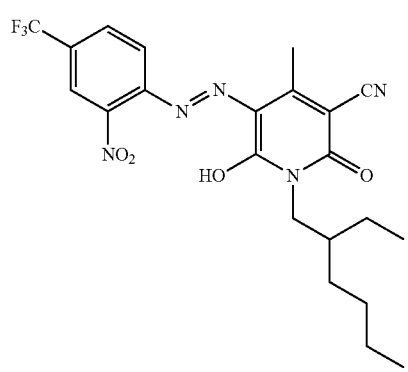
Comparative Compound A2
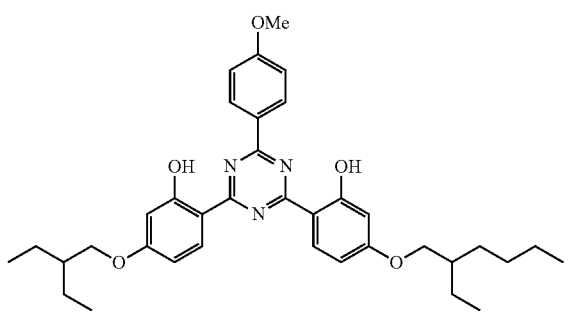
Comparative Compound M1
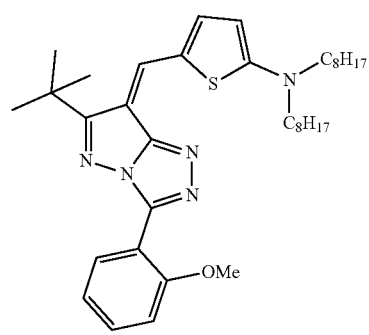
Comparative Compound A3
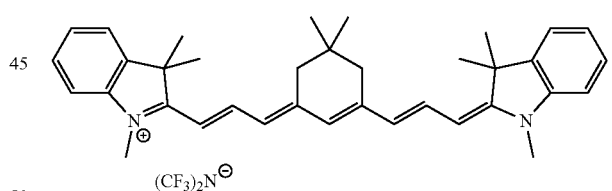
Comparative Compound M2
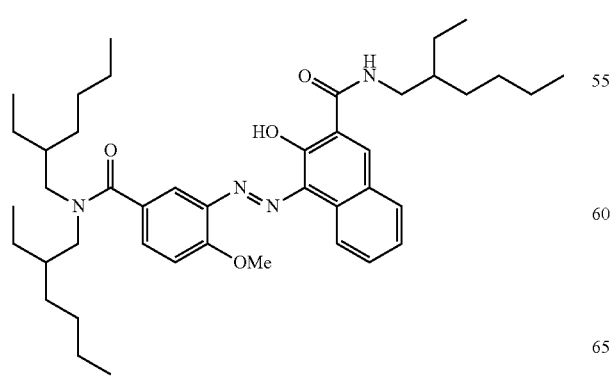
Comparative Compound A4
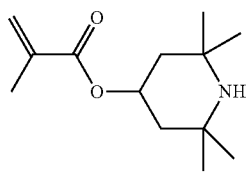

TABLE 1

| | Dye | Additive agent | Ratio of additive agent/dye | Scumming | | OD | OD residual ratio |
|---|---|---|---|---|---|---|---|
| Example | | | | | | | |
| 1 | Compound (2-3) | Compound (1-1) | 1 | 0.00 | OK | 2.03 | 0.95 |
| 2 | Compound (2-15) | Compound (1-2) | 1 | 0.00 | OK | 2.01 | 0.95 |
| 3 | Compound (2-20) | Compound (1-2) | 1 | 0.01 | OK | 2.11 | 0.90 |
| 4 | Compound (2-21) | Compound (1-3) | 1 | 0.00 | OK | 2.06 | 0.94 |
| 5 | Compound (2-24) | Compound (1-3) | 1 | 0.02 | OK | 2.08 | 0.97 |
| 6 | Compound (2-39) | Compound (1-7) | 1 | 0.00 | OK | 2.06 | 0.92 |
| 7 | Compound (3-1) | Compound (1-1) | 1 | 0.00 | OK | 2.42 | ≈1.00 |
| 8 | Compound (3-2) | Compound (1-3) | 1 | 0.05 | OK | 2.55 | ≈1.00 |
| 9 | Compound (3-5) | Compound (1-3) | 1 | 0.02 | OK | 2.50 | ≈1.00 |
| 10 | Compound (4-6) | Compound (1-1) | 2 | 0.01 | OK | 2.22 | 0.91 |
| 11 | Compound (4-16) | Compound (1-3) | 2 | 0.00 | OK | 2.31 | 0.98 |
| 12 | Compound (4-20) | Compound (1-3) | 2 | 0.00 | OK | 2.39 | ≈1.00 |
| 13 | Compound (4-25) | Compound (1-1) | 2 | 0.01 | OK | 2.36 | 0.97 |
| 14 | Compound (4-33) | Compound (1-7) | 2 | 0.00 | OK | 2.19 | ≈1.00 |
| Comparative Example | | | | | | | |
| 1 | Comparative compound C1 | None | 0 | 0.00 | OK | 1.81 | 0.89 |
| 2 | Comparative compound C1 | Compound (1-3) | 1 | 0.00 | OK | 1.72 | 0.64 |
| 3 | Comparative compound C1 | Comparative compound A1 | 1 | 0.00 | OK | 1.77 | 0.77 |
| 4 | Compound (2-3) | None | 0 | 0.01 | OK | 1.88 | 0.78 |
| 5 | Compound (2-15) | None | 0 | 0.01 | OK | 1.70 | 0.85 |
| 6 | Compound (2-20) | None | 0 | 0.01 | OK | 1.90 | 0.77 |
| 7 | Compound (2-21) | None | 0 | 0.01 | OK | 1.86 | 0.83 |
| 8 | Compound (2-24) | None | 0 | 0.00 | OK | 1.83 | 0.80 |
| 9 | Compound (2-39) | None | 0 | 0.00 | OK | 1.83 | 0.79 |
| 10 | Compound (2-21) | Comparative compound A1 | 2 | 0.57 | NG | 2.24 | ≈1.00 |
| 11 | Compound (2-21) | Comparative compound A2 | 1 | 0.08 | OK | 1.56 | 0.94 |
| 12 | Compound (2-21) | Comparative compound A3 | 1 | 0.01 | OK | 1.60 | 0.64 |
| 13 | Compound (2-21) | Comparative compound A4 | 1 | 0.01 | OK | 2.11 | 0.32 |
| 14 | Compound (3-1) | None | 0 | 0.00 | OK | 2.30 | 0.98 |
| 15 | Compound (3-2) | None | 0 | 0.00 | OK | 2.39 | ≈1.00 |
| 16 | Compound (3-5) | None | 0 | 0.00 | OK | 2.36 | ≈1.00 |
| 17 | Compound (3-2) | Comparative compound A1 | 1 | 0.11 | NG | 2.45 | ≈1.00 |
| 18 | Comparative compound Y1 | None | 0 | 0.00 | OK | 2.26 | 0.85 |
| 19 | Comparative compound Y1 | Compound (1-3) | 1 | 0.35 | NG | 2.46 | 0.64 |
| 20 | Comparative compound Y1 | Comparative compound A1 | 1 | 0.05 | OK | 2.36 | 0.68 |
| 21 | Comparative compound Y2 | None | 0 | 0.00 | OK | 1.67 | 0.81 |
| 22 | Comparative compound Y2 | Compound (1-3) | 1 | 0.01 | OK | 1.97 | 0.61 |
| 23 | Compound (4-6) | None | 0 | 0.22 | NG | 2.02 | 0.94 |
| 24 | Compound (4-16) | None | 0 | 0.34 | NG | 2.09 | 0.94 |
| 25 | Compound (4-20) | None | 0 | 0.02 | OK | 2.21 | 0.93 |
| 26 | Compound (4-25) | None | 0 | 0.27 | NG | 1.98 | 0.93 |
| 27 | Compound (4-33) | None | 0 | 0.18 | NG | 1.93 | 0.92 |
| 28 | Compound (4-16) | Comparative compound A1 | 1 | 0.30 | NG | 2.20 | 0.98 |
| 29 | Compound (4-16) | Comparative compound A3 | 1 | 0.11 | NG | 1.93 | 0.51 |
| 30 | Comparative compound M1 | None | 0 | 0.01 | OK | 2.30 | 0.03 |
| 31 | Comparative compound M1 | Comparative compound A1 | 1 | 0.16 | NG | 2.44 | 0.02 |
| 32 | Comparative compound M1 | Comparative compound A2 | 1 | 0.01 | OK | 2.10 | 0.04 |
| 33 | Comparative compound M2 | None | 0 | 0.00 | OK | 1.13 | 0.05 |
| 34 | Comparative compound M2 | Compound (1-3) | 1 | 0.01 | OK | 1.27 | 0.04 |

As shown in Table 1, it was found that the combinations in Examples had very high optical density and high light resistance (OD residual ratio) without generating scumming, and their evaluation results were superior to those of the dyes alone. Furthermore, the combinations of Examples were found to have an extremely high OD of 2 or more and O.D. residual ratio of 0.90 or more.

In addition, from the comparison between Example 4 and Comparative Example 7, for example, it was found that the combination of the "dye compound (2-21)" and the "additive agent compound (1-3)" improves both OD and OD residual ratio (light resistance) compared to the case of the "dye compound (2-21)" alone.

However, from the comparison between Comparative Example 2 and Comparative Example 1, it was found that the combination of the "dye comparative compound C1" and the "additive agent compound (1-3)" reduces both OD and light resistance compared to the case of the "dye comparative compound C1" alone.

In other words, it was found that even the same ultraviolet light absorber (compound (1-3)) cannot improve OD and light resistance unless it is added to an appropriate dye.

As described above, from the comparison between Example 4 and Comparative Example 7, it was found that the combination of the "dye compound (2-21)" and the "additive agent compound (1-3)" improves both OD and light resistance compared to the case of the "dye compound (2-21)" alone.

However, it was found that, even with the same "dye compound (2-21)", scumming was generated (Comparative Example 10), the OD was reduced (Comparative Examples 11 to 12), or the OD residual ratio (light resistance) was reduced (Comparative Examples 12 to 13) unless an appropriate ultraviolet light absorber was used.

As described above, in Example 4, the "additive agent compound (1-3)" improved both OD and light resistance compared to the case of Comparative Example 7, where only the "dye compound (2-21)" was used.

However, in Comparative Example 22, the "additive agent compound (1-3)" improved OD compared to the case of Comparative Example 21, where only the "dye comparative compound Y2" was used, but reduced OD residual ratio (light resistance).

The compound (2-21) used in Example 4 and Comparative Example 7 is a dye having the same pyridone skeleton as the comparative compound Y2 used in Comparative Example 22 and Comparative Example 21.

In other words, by comparing Example 4 with Comparative Example 7 and by comparing Comparative Example 22 with Comparative Example 21, it was found that even when the same ultraviolet light absorber (compound (1-3)) is used for dyes having the same pyridone skeleton, it cannot improve both OD and OD residual ratio (light resistance).

That is, it was found that it is necessary to combine a dye having a particular structure with an ultraviolet light absorber having a particular structure.

The combination of a dye having a particular structure and an ultraviolet light absorber having a particular structure of the present disclosure can be suitably used as a heat sensitive transfer recording sheet having high optical density and high light resistance without generating scumming.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-119747, filed Jun. 27, 2019, which is hereby incorporated by reference herein in its entirety.

What is claimed is:

1. A heat sensitive transfer recording sheet, having
   a base material and a coloring material layer formed on the base material,
   wherein the coloring material layer comprises a compound (1-3), and any one compound selected from the compound group consisting of compound (2-21), a compound (2-24), a compound (3-2), a compound (3-5), a compound (4-16), and a compound (4-20):

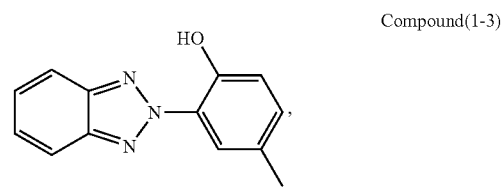

Compound(1-3)

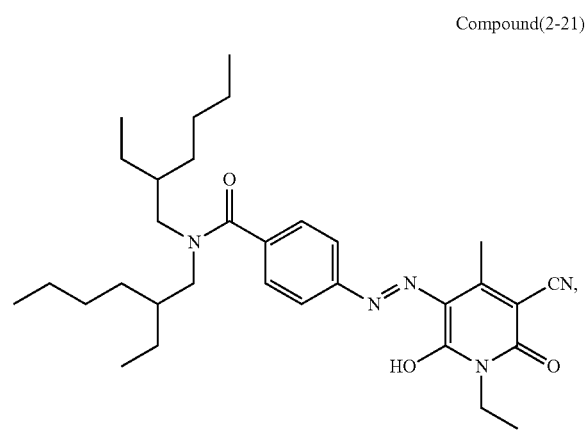

Compound(2-21)

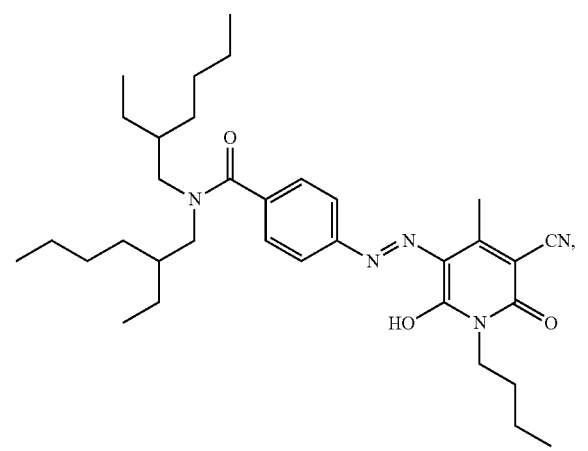

Compound(2-24)

Compound(3-2)

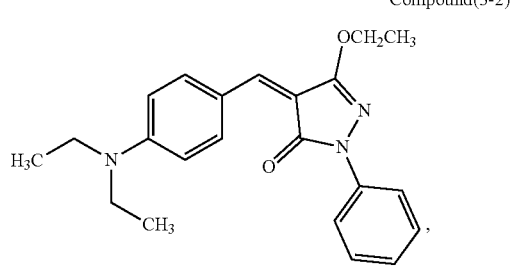

Compound(3-5)

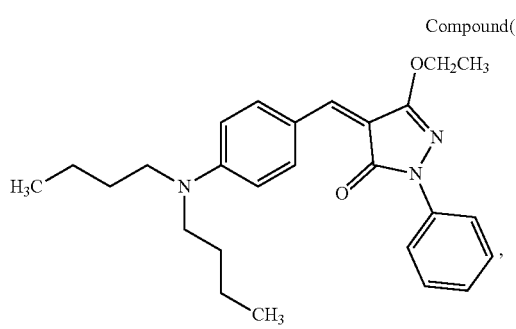

Compound(4-16)

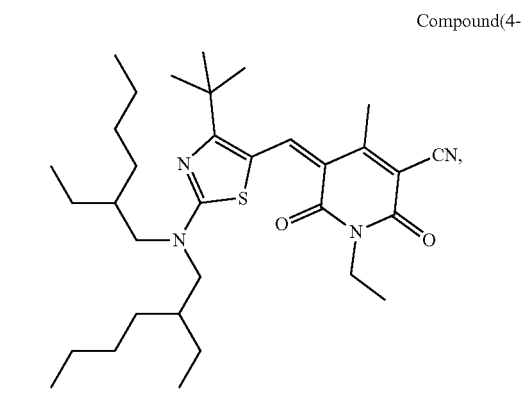

Compound(4-20)

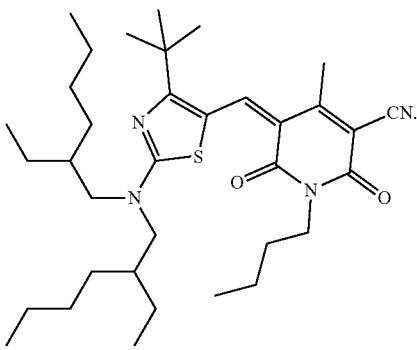

2. The heat sensitive transfer recording sheet according to claim 1, wherein a content of the compound (1-3) in the coloring material layer and a content of any one compound selected from the compound group consisting of the compound (2-21), the compound (2-24), the compound (3-2), (3-5), the compound (4-16), and the compound (4-20) satisfy the following relationship based on the mass:

the compound (1-3)/(any one compound selected from the compound group consisting of the compound (2-21), the compound (2-24), the compound (3-2), the compound (3-5), the compound (4-16), and the compound (4-20)=1 to 2.

3. The heat sensitive transfer recording sheet according to claim 1, wherein the coloring material layer comprises a binder resin; and
the content of the compound (1-3) is 1 part by mass or more and 40 parts by mass or less based on 100 parts by mass of the binder resin.

4. The heat sensitive transfer recording sheet according to claim 1, wherein the coloring material layer comprises a binder resin; and
the content of any one compound selected from the compound group consisting of the compound (2-21), the compound (2-24), the compound (3-2), the compound (3-5), the compound (4-16), and the compound (4-20) is 1 part by mass or more and 20 parts by mass or less based on 100 parts by mass of the binder resin.

* * * * *